May 15, 1934.  W. HOLLIDAY  1,958,947
LAWN MOWER SHARPENER ATTACHMENT
Filed Feb. 1, 1932  2 Sheets-Sheet 2
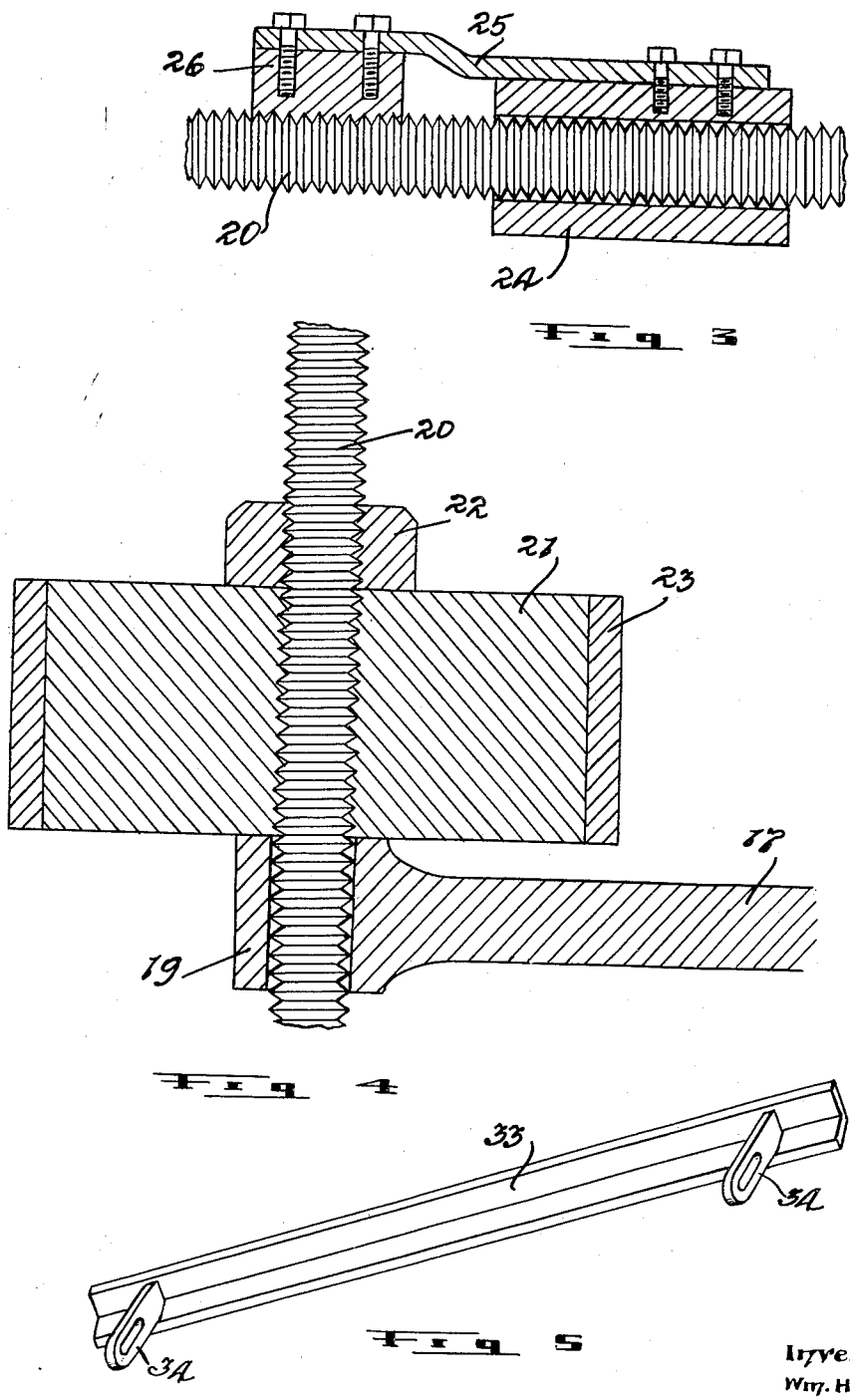
Inventor
Wm. Holliday Patented May 15, 1934

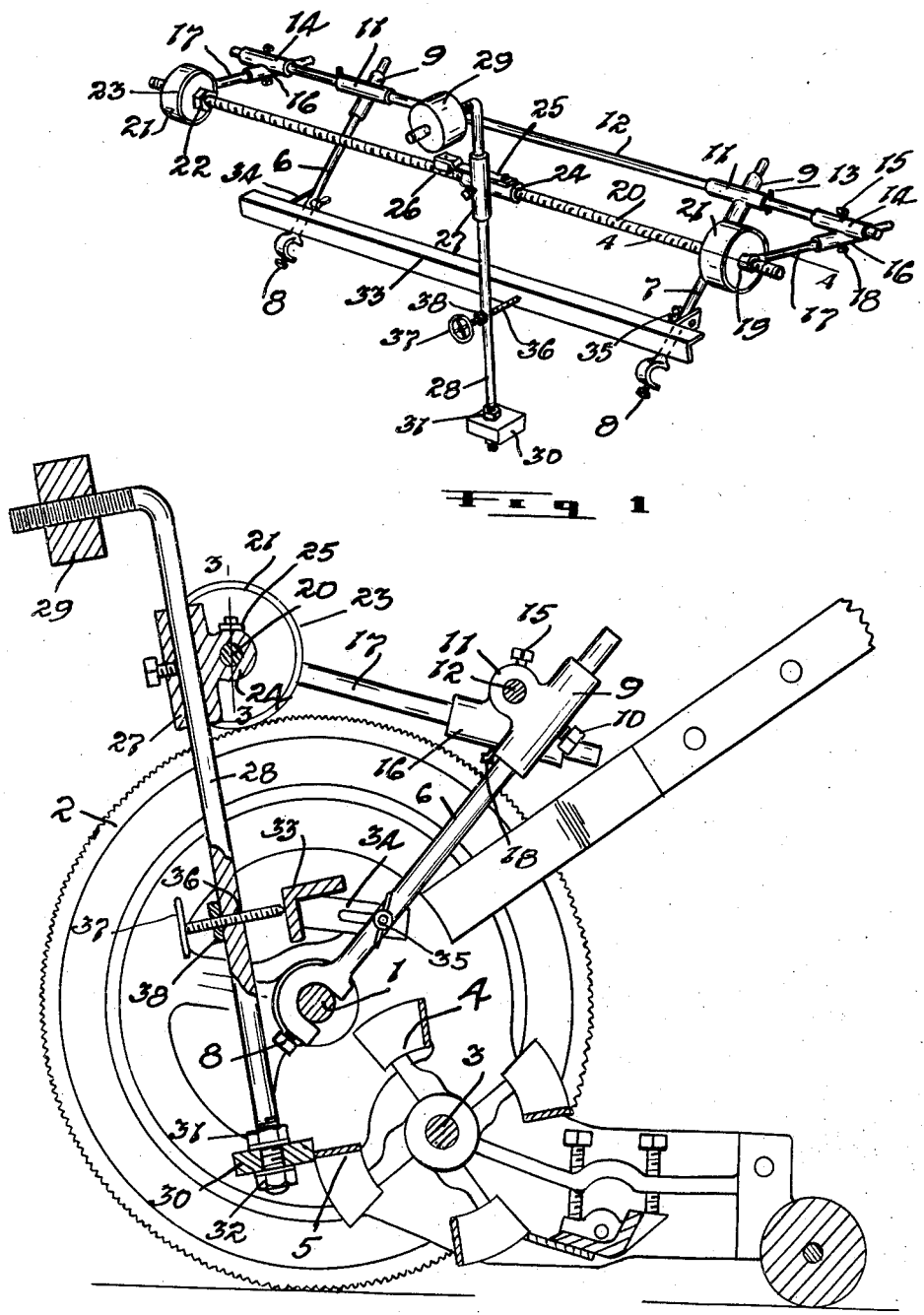

1,958,947

UNITED STATES PATENT OFFICE 1,958,947

LAWN MOWER SHARPENER ATTACHMENT

William Holliday, Pointe du Bois, Manitoba, Canada

Application February 1, 1932, Serial No. 590,171
In Canada November 28, 1931

4 Claims. (Cl. 51—249)

The invention relates to improvements in lawn mower sharpener attachments and an object of the invention is to provide a sharpener which can be easily and quickly attached to the existing lawn mower and when attached can be easily and quickly adjusted in respect to the lawn mower blades so that upon the ground or driving wheels of the mower being rotated, the device will operate to evenly and effectively sharpen the blades.

A further object is to construct the device so that it can be readily adjusted in length to accommodate the various sizes of lawn mowers and such that it can be readily mounted on or detached from the lawn mower as occasion requires.

A further object is to provide a sharpening attachment having a grindstone mounted so that it can be readily adjusted in a direction radial to the longitudinal axis of the blades and such that when the blades are rotated the stone will be moved in a direction parallel to the longitudinal axis of the blades, such arrangement permitting of the effective sharpening of the rotated blades.

A further object is to construct the parts constituting the attachment so that they are all connected one to the other thereby permitting of the handling of the appliance as a unit structure, also avoiding the possibility of parts becoming misplaced or lost.

A further object is to provide a sharpener which will sharpen the blades evenly so that there will be no high or low spots thereon and a still further object is to construct all parts in a simple, durable and inexpensive manner.

With the above more important objects in view, the invention consists essentially in the arrangement and construction of parts hereinafter more particularly described, reference being had to the accompanying drawings, in which:—

Fig. 1 is a perspective view of the sharpener.

Fig. 2 is a vertical cross sectional view through a lawn mower equipped with my invention.

Fig. 3 is a vertical sectional view at 3—3 Figure 2.

Fig. 4 is a horizontal sectional view at 4—4 Figure 1.

Fig. 5 is a perspective view of the guide bar.

In the drawings like characters of reference indicate corresponding parts in the several figures.

In the following description I have not considered it necessary to show or describe in detail all the well known parts of the conventional lawn mower as such parts are too well known to require detailed description.

The sharpening device which I provide is detachably mounted on the main cross shaft or axle 1 of the lawn mower and has driving wheels which are adapted to ride the customary ground wheels 2 of the lawn mower and the ground wheels drive in the usual manner the shaft 3 of the usual lawn mower reel 4 which is provided with the customary spirally arranged cutting blades 5.

The manner in which the ground wheels drive the cutting blade of the conventional lawn mower is well known and accordingly the description of the same is not herein considered necessary, it being sufficient for the purpose of this specification to understand that upon either one or both of the ground wheels being driven, the blades are rotated in the usual manner.

The attachment, which I provide, comprises the parts now described.

A pair of similar supporting arms 6 and 7 are supplied, these having their forward ends provided with opposing jaws adapted to span the main axle 1 of the mower. Jam screws 8 are carried by the jaws so that one can quickly clamp the arms to the axle by tightening up the screws after the jaws have received the axle. On the rear ends of the arms, I mount slidably similar sleeves 9 provided with set screws 10 for adjusting purposes and these sleeves carry further sleeves 11 which form bearings supporting a rearwardly disposed elevated cross shaft 12.

The cross shaft is supplied with pins 13 preventing end shifting thereof and on the ends of the cross shaft I mount similar end sleeves 14 provided with set screws 15 permitting adjustment of the latter sleeves in respect to the cross shaft. The sleeves 14 carry on their under sides further sleeves 16 which receive slidably end hangers or rods 17 adjustably fastened to the sleeves by jam screws 18. The forward ends of the hanger 17 are fitted with bearings 19 which receive rotatably the ends of a screw threaded shaft 20. On the shaft 20, I mount similar driving wheels 21 which actually are screw threaded onto the shaft and are held in any adjacent position by lock nuts 22 carried by the shaft. The wheels are fitted with friction bands 23 such as rubber bands and are positioned so that they will ride the upper sides of the lawn mower wheels 2. The rubber bands insure an effective driving contact.

Obviously the sleeves 14 can be adjusted on the cross shaft and the hangers 17 adjusted in the sleeves 16 to insure that the wheels 21 will be properly positioned in respect to the wheels 2 of the mower on which the device is applied.

On the threaded shaft 20, I mount slidably a sleeve 24 and the sleeve has secured permanently thereto one end of a spring bar 25, the other end of which carries a rider 26 in the form of the half of a split nut which engages the shaft 20. The latter arrangement is such that when the nut is engaged with the shaft the sleeve will be forcibly moved endwise of the shaft being driven by the threads of the shaft in the rotation thereof. Obviously, however, if one lifts the rider clear of the shaft 20, he can shift the sleeve freely endwise of the said shaft.

The sleeve 24 carries a further sleeve 27 in which I have slidably mounted a bar or rod 28, the rod having its upper end bent forwardly at right angles to the body part thereof and screw threaded to receive a weight 29. On the lower end of the rod 28, I mount a grindstone 30 which is actually screw threaded on the rod and is held in fixed relation to the rod by upper and lower lock nuts 31 and 32 supplied. The side of the stone towards the reel of the mower is concaved and has the radius of curvature approximately equal to the radius of the reel.

A guide bar 33 is supplied which requires to be straight and the guide bar is provided adjoining its ends with slotted lugs 34 adapted to receive adjusting bolts 35 carried by the arms 6 and 7. A screw threaded spacing shank or bolt 36 is screw threaded through the rod 28 and has its rear end engaging the guide bar and its forward end provided with a hand grip 37. A lock nut 38 is supplied to hold the shank 36 in any adjusted position.

It will be observed that the weight 29 has a natural tendency to continuously swing the grindstone rearwardly towards the blades and that the rear position of the grindstone is limited by the rear end of the shank engaging the guide bar 33.

Accordingly one can adjust the fore or aft position of the grindstone by turning the hand grip 37 in the proper direction and as the bar 33 passes approximately the full length of the reel, the grindstone will be held in its adjusted position in relation to the blades as it travels from side to side of the lawn mower.

When it is desired to use the device for sharpening the blades of a lawn mover, it is clamped to the main axle 1 in the manner shown and the wheels 21 are then adjusted so that they will ride the ground wheels 2 of the mower. The rider 26 is raised and the sleeve 24 is slid to say the left hand end of the shaft 20 and this places the grindstone at the left end of the mower. One then adjusts the guide bar 33 by means of the bolts 35 into a position approximately parallel with the blade shaft and then adjusts the shank 30 to bring the grindstone into contact with the end of one of the blades. The rider is then raised and the sleeve 24 is slid onto the shaft 20 to the right hand end of the mower and the guide bar is then finally adjusted at that end of the mower so that the grindstone is engaging the adjacent end of the blade in the foremost position of such blade. This being accomplished, the rider is released and the sleeve 24 is slid along the shaft to the opposite end of the mower. One can then turn one or other of the wheels 2 and such will drive the shaft 20 and as such shaft rotates, the sleeve 24 will be gradually passed from the left hand end of the mower to the right hand side thereof and as the sleeve so moves, the grindstone will be shifted to effect the sharpening of the passing blades and it will be observed that the shank 36 by engagement with the guide bar serves to hold the stone properly positioned in respect to the blades.

One can readily vary the pressure of the stone against the blades by turning the weight 29 out or in on the upper end of the rod 28 and obviously the depth of the cut of the grindstone can be readily varied by adjusting the shank 36.

When not in use, the device can be retained on the lawn mower if desired and at such time, one can release the jam screws 15 and then swing the shaft 23 rearwardly to rest on the lawn mower handle. When so positioned, the rod 28 will have its forward end supported by the rear cross shaft 12.

What I claim as my invention is:—

1. The combination with the cutting reel and the ground wheels of a lawn mower, of a blade sharpening attachment comprising shaft carrying means detachably secured to a stationary part of the mower, a screw threaded shaft rotatably carried by said carrying means, end wheels secured to the ends of the shaft and riding the ground wheels of the mower, a sleeve mounted on the shaft for end shifting and rotary movement, a rider carried by the sleeve and releasably engaging the threads of the shaft to effect when engaged the end shifting of the sleeve on the shaft, a bar adjustably carried by the sleeve, a non-rotary grinding stone mounted on the lower end of the bar and opposing the reel, means yieldingly pressing the grinding stone towards the reel, an adjustable guide bar carried by the shaft carrying means and passing from end to end of the mower and a member adjustably carried by the former bar and engageable with the latter.

2. The combination with the axle, the reel and the ground wheels of a lawn mower, of a blade sharpening attachment comprising a pair of spaced rearwardly and upwardly extending arms detachably clamped to the axle, a cross shaft carried by the upper ends of the arms, a pair of forwardly extending hangers adjustably carried by the ends of the shaft, a screw threaded shaft rotatably carried by the forward ends of the hangers, end wheels secured to the latter shaft and riding the ground wheels of the mower, a sleeve endwise shiftable on the latter shaft and rotatable therearound, a rider carried by the sleeve and normally engaged with the threads of the shaft to effect the endwise shifting of the sleeve in the rotation of the shaft, an upstanding bar adjustably carried by the sleeve and having its upper end weighted to effect the rear swinging of the lower end of the bar towards the reel, a non-rotary grindstone mounted on the lower end of the bar and engageable with the blades of the reel, a guide bar extending from end to end of the mower and adjustably carried by the arms aforesaid and an adjusting screw carried by the former bar and engaging the latter bar.

3. A lawn mower blade sharpening attachment comprising a pair of spaced arms provided with means for clamping the same to a fixed part of a mower, a shaft connecting the arms and adjustable thereon, a pair of endwise adjustable hangers extending forwardly from the shaft and adjustably carried thereby, a screw threaded shaft rotatably carried by the forward ends of the hangers, driving wheels adjustably mounted on the screw threaded shaft, a guide bar adjustably carried by the arms, a sleeve rotatably mounted on the screw threaded shaft and endwise shiftable thereon, a rider carried by the sleeve and normally engageable with the threads of the shaft and adapted to end shift the sleeve on the shaft in the rotation of the latter, an upstanding bar adjustably carried by the sleeve and having its upper end forwardly turned and weighted, a non-rotary grindstone mounted on the lower end of the latter bar and an adjusting screw carried by the latter bar and engageable with the guide bar aforesaid.

4. The combination with the cutting reel and the ground wheels of a lawn mower, of a blade sharpening attachment comprising shaft carrying means detachably secured to the mower, a screw threaded shaft carried by said carrying means, wheels secured to the shaft rotatable with the movement in action of the mower, a sleeve mounted on the shaft for end shifting and rotary movement, a rider carried by the sleeve and engaging the threads of the shaft to effect the end shifting of the sleeve on the shaft, an element carried by the sleeve, a non-rotary grinding stone mounted on said element, means yieldably pressing the grinding stone against said cutting reel, an adjustable guide bar carried by the shaft carrying means and a member adjustably carried by said element and engageable with said guide bar.

WILLIAM HOLLIDAY.